United States Patent  
Shah

(10) Patent No.: US 8,332,927 B1  
(45) Date of Patent: *Dec. 11, 2012

(54) MERGING FILTER RULES TO REDUCE FORWARDING PATH LOOKUP CYCLES

(75) Inventor: Sandip Shah, Milpitas, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/294,031

(22) Filed: Nov. 10, 2011

Related U.S. Application Data

(63) Continuation of application No. 11/837,081, filed on Aug. 10, 2007, now Pat. No. 8,065,721.

(51) Int. Cl.
*G06F 15/16* (2006.01)
(52) U.S. Cl. .......................................... 726/13
(58) Field of Classification Search ............... 726/13
See application file for complete search history.

(56) References Cited

U.S. PATENT DOCUMENTS

| 6,289,013 | B1* | 9/2001 | Lakshman et al. ........... 370/389 |
| 6,631,419 | B1 | 10/2003 | Greene |
| 6,917,946 | B2* | 7/2005 | Corl et al. ..................... 707/737 |
| 7,054,930 | B1 | 5/2006 | Cheriton |
| 7,409,707 | B2* | 8/2008 | Swander et al. ................. 726/13 |
| 7,505,463 | B2* | 3/2009 | Schuba et al. ................ 370/392 |
| 7,551,629 | B2* | 6/2009 | Chen et al. .................... 370/401 |
| 2007/0039044 | A1 | 2/2007 | Moonen |

* cited by examiner

*Primary Examiner* — Kambiz Zand
*Assistant Examiner* — Amare F Tabor
(74) *Attorney, Agent, or Firm* — Shumaker & Sieffert, P.A.

(57) ABSTRACT

The invention is directed to techniques for managing filter rules applied to network traffic at a network device. A network device merges multiple filter rules associated with separate filter matching modules to reduce lookup cycles in a forwarding path of the network device. The network device may thus simultaneously apply multiple filter rules in a reduced number of clock cycles. A network device comprises an interface that receives packets from a network, a filter memory that stores a plurality of filters, and a plurality of filter matching modules that apply the filters to packets in a forwarding path of the network device. A filter control module merges two or more filters each associated with a different one of the filter matching modules into a single merged filter, and stores the merged filter to the filter memory. The network device applies the merged filter to packets in the forwarding path.

15 Claims, 6 Drawing Sheets

FILTER MEMORY 56

| FILTER 60 | RULES 62 | | |
|---|---|---|---|
| | RULE ID 64 | MATCHING CRITERIA 66 | ACTION ID 68 |
| $F_3$ | $R_{31}$ | SOURCE IP ADDRESS 2.2.2.2 | $A_1$ |
| | | | |
| $F_4$ | $R_{41}$ | SOURCE IP ADDRESS 2.2.2.2 | $A_2$ |
| | | | |
| $F_5$ | $R_{51}$ | SOURCE PORT 10 | $A_3$ |
| | | | |
| $F_6$ | $R_{61}$ | SOURCE PORT 10 | $A_4$ |
| | | | |
| $F_{34}$ | $R_{31} \oplus R_{41}$ | SOURCE IP ADDRESS 2.2.2.2 | $A_1, A_2$ |
| | $R_{31}$ | SOURCE IP ADDRESS 2.2.2.2 | $A_1$ |
| | $R_{41}$ | SOURCE IP ADDRESS 2.2.2.2 | $A_2$ |
| | | | |
| $F_{56}$ | $R_{51} \oplus R_{61}$ | SOURCE PORT 10 | $A_3, A_4$ |
| | $R_{51}$ | SOURCE PORT 10 | $A_3$ |
| | $R_{61}$ | SOURCE PORT 10 | $A_4$ |

FIG. 3

ACTION MEMORY

| ACTION ID | ACTION |
|---|---|
| $A_1$ | DROP PACKET |
| $A_2$ | COUNT PACKET |
| $A_3$ | IF > 1MEG BANDWIDTH, DISCARD PACKET |
| ⋮ | ⋮ |
| $A_N$ | ... |

FIG. 4

MERGING FILTER RULES TO REDUCE FORWARDING PATH LOOKUP CYCLES

CROSS REFERENCE TO RELATED APPLICATIONS

This application is a continuation of application Ser. No. 11/837,081, filed Aug. 10, 2007, the entire content of which is incorporated herein by reference.

TECHNICAL FIELD

The invention relates to computer networks and, more particularly, to techniques for protecting devices within networks.

BACKGROUND

Due to increasing reliance on network-accessible computers, network security has become a major issue for organizations and individuals. To help ensure the security of their computers, organizations and individuals frequently install security devices between their private networks and public networks. A goal of such security devices is to prevent unwanted or malicious information from the public network from affecting devices in the private network.

One example of a commonly deployed security device is a firewall. A firewall, for example, is a dedicated or virtual device that is configured to permit or deny traffic flows based on an organization's security policies. Firewall functionality can be implemented at various layers of the network stack, as specified with respect to the Open Systems Interconnection Basic Reference Model ("OSI Reference Model"). For example, a network layer firewall operates at the network layer (i.e., layer three (L3) of the OSI Reference Model) and is referred to an L3 device or network layer device. As another example, a layer two (L2) firewall operates within the second layer of the OSI Reference Model, also known as the data link layer, to restrict L2 network communications in accordance with an organization's policies. An L3 firewall may provide security features as well as packet forwarding, routing or other L3 functionality. A L2 firewall may provide security features along with switching or other L2 functionality. A third type of firewall, referred to as an application-layer firewall, operates above L3 of the network stack to assemble application-layer data and perform deep packet inspection to identify viruses or network attacks. A network device such as a switch or a router may incorporate firewall functionality in addition to switching or routing functionality.

SUMMARY

In general, the invention is directed to techniques for managing filter rules applied to network traffic at a network device. For example, the techniques of the invention may enable a network device to merge multiple traffic filter rules to reduce lookup cycles in a forwarding path of the network device. That is, the techniques may allow the network device to merge the multiple filter rules that may be applied in hardware as a single filter rule. The techniques may allow the network device to simultaneously apply multiple filter rules in a reduced number of clock cycles, thereby meeting any tight timing constraints of the hardware. Moreover, the filter rules to be merged may be associated with one or more separate hardware modules (referred to filter matching modules) of the network device.

The network device may maintain a plurality of filters in a filter memory accessible by different filter matching modules of the network device. Each of the filters may specify one or more rules. Each rule may consist of matching criteria and a corresponding action to be applied upon identifying a packet that matches the matching criteria. The network device may merge the rules of two or more filters to form a merged filter based on the rules and corresponding actions specified by the rules. For example, the network device may form a merged filter by taking the intersection of the rules and the union of the corresponding actions for all the filters to be merged. The result is a merged filter comprising one or more merged rules. The network device stores the merged rule to the filter memory. When processing network traffic, the network device may access the merged rule from the filter memory and apply the merged rule to packets in the forwarding path of the network device in tight timing constraints, such as a single lookup cycle.

The techniques described herein may be applied to a variety of network devices, including high-speed network switches, routers, firewalls, gateways and other network devices. The techniques may allow, for example, a high-speed network switch to apply firewall filters and still achieve line-rate performance for packet throughput. In addition, the techniques described herein may make some of the memory access and filter look-up cycles formerly required by the filter matching components available for other components within the network device, so that the network device may provide additional functionality without a corresponding decrease in performance levels.

In one embodiment, a method comprises receiving configuration input defining a plurality of filters for a network device, wherein each of the filters is associated with at least one of a plurality of filter matching modules provided by hardware components of the network device, and wherein the filter matching modules apply the filters to packets in a forwarding path internal to the network device, merging two or more of the plurality of filters that are each associated with a different one of the plurality of filter matching modules into a single merged filter, storing the merged filter to a filter memory within the network device, and applying the merged filter to packets in the forwarding path.

In another embodiment, network device comprises an interface that receives packets from a network, a filter memory that stores a plurality of filters, and one or more switching hardware components that provide a forwarding path internal to the network device, wherein the switching hardware components include a plurality of filter matching modules that apply the filters to packets along the forwarding path of the network device, wherein each of the filters is associated with at least one of the plurality of filter matching modules. The network device further comprises a filter control module that merges two or more of the plurality of filters that are each associated with a different one of the plurality of filter matching modules into a single merged filter, and stores the merged filter to the filter memory for application to packets in the forwarding path by the filter matching modules.

In another embodiment, a computer-readable medium comprises instructions for causing a programmable processor to maintain a plurality of filters in a filter memory of a network device, wherein each of the filters is associated with at least one of a plurality of filter matching modules provided by hardware components of the network device, and wherein the filter matching modules apply the filters to packets in a forwarding path internal to the network device, merge two or more of the plurality of filters that are each associated with a different one of the plurality of filter matching modules into a single merged filter, store the merged filter to the filter memory, and apply the merged filter to packets in the forwarding path.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 3-4 are block diagrams illustrating example data structures maintained by the network device of FIG. 2.

DETAILED DESCRIPTION

Figure 1:
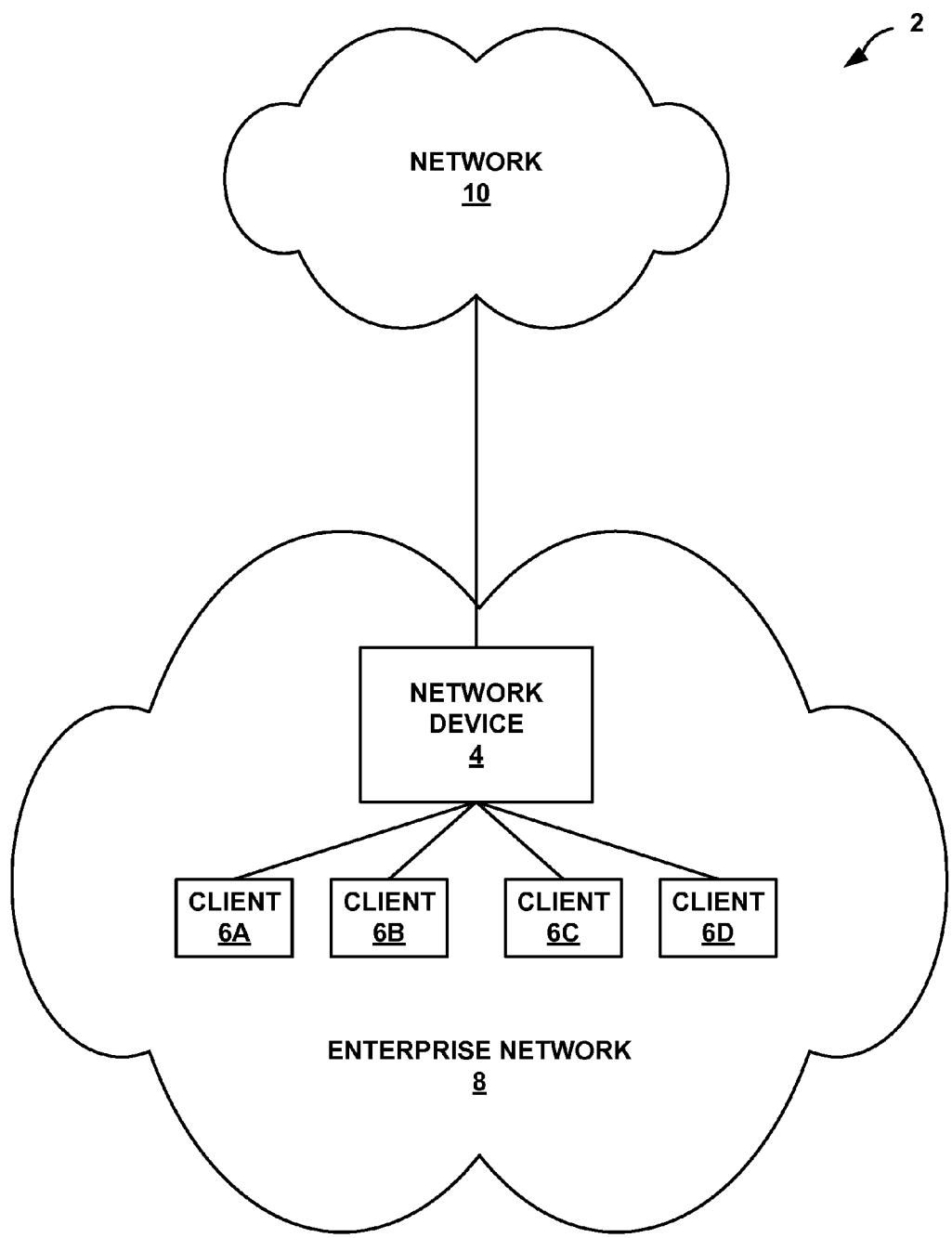
FIG. 1 is a block diagram illustrating an example system in which a network device manages filter rules in accordance with the principles of the invention.

FIG. 1 is a block diagram illustrating an example system 2 in which a network device 4 manages filter rules in accordance with the principles of the invention. In the example of FIG. 1, network device 4 is coupled to client devices 6A-6D ("client devices 6") within enterprise network 8. Network device 4 may be a high speed Ethernet switch, such as a layer two (L2) Ethernet switch, and may include components for providing firewall services to protect client devices 6 within enterprise network 8 from malicious communications. Network device 4 may also include components for providing layer 3 (L3) functionality, such as routing functionality.

Network 10 may be a public network, such as the Internet. Client devices 6A-6D ("client devices 6") within enterprise network 8 may be any of a variety of computing devices such as personal computers, laptop computers, handheld computers, workstations, servers, switches, printers, or other devices. Enterprise network 8 may include a variety of other network devices (not shown), such as routers, switches, servers, and the like, and may be connected to other networks.

In accordance with the principles of the invention, network device 4 applies firewall filters to network traffic originating from network 10 to prevent malicious or unauthorized communications. As described in further detail herein, network device 4 may include hardware components for selectively filtering traffic based on criteria, such as source and destination address, source and destination port, or the type of protocol. Network device 4 may include firewall components for matching filters to inbound packets as well as firewall components for matching the filters to outbound packets.

Network device 4 may incorporate multiple firewall components on a single chip, such as an application-specific integrated circuit (ASIC). In one embodiment, to reduce cycles required by the firewall components, network device 4 merges multiple filters for the separate components into a single filter to be applied by the ASIC. In other words, network device 4 merges the filters associated with two or more of the firewall components to reduce the number of clock cycles the firewall components require to look up and apply the filters, thus allowing network device 4 to achieve line-rate performance of packet throughput by the network device 4 or otherwise satisfy timing constraints of its hardware components.

The techniques described herein may allow network device to achieve line-rate performance of packet throughput. In addition, the techniques described herein may make look-up cycles formerly required by the firewall components available for other components within network device 4, so that network device 4 may provide additional functionality without decreasing performance levels.

Figure 2:
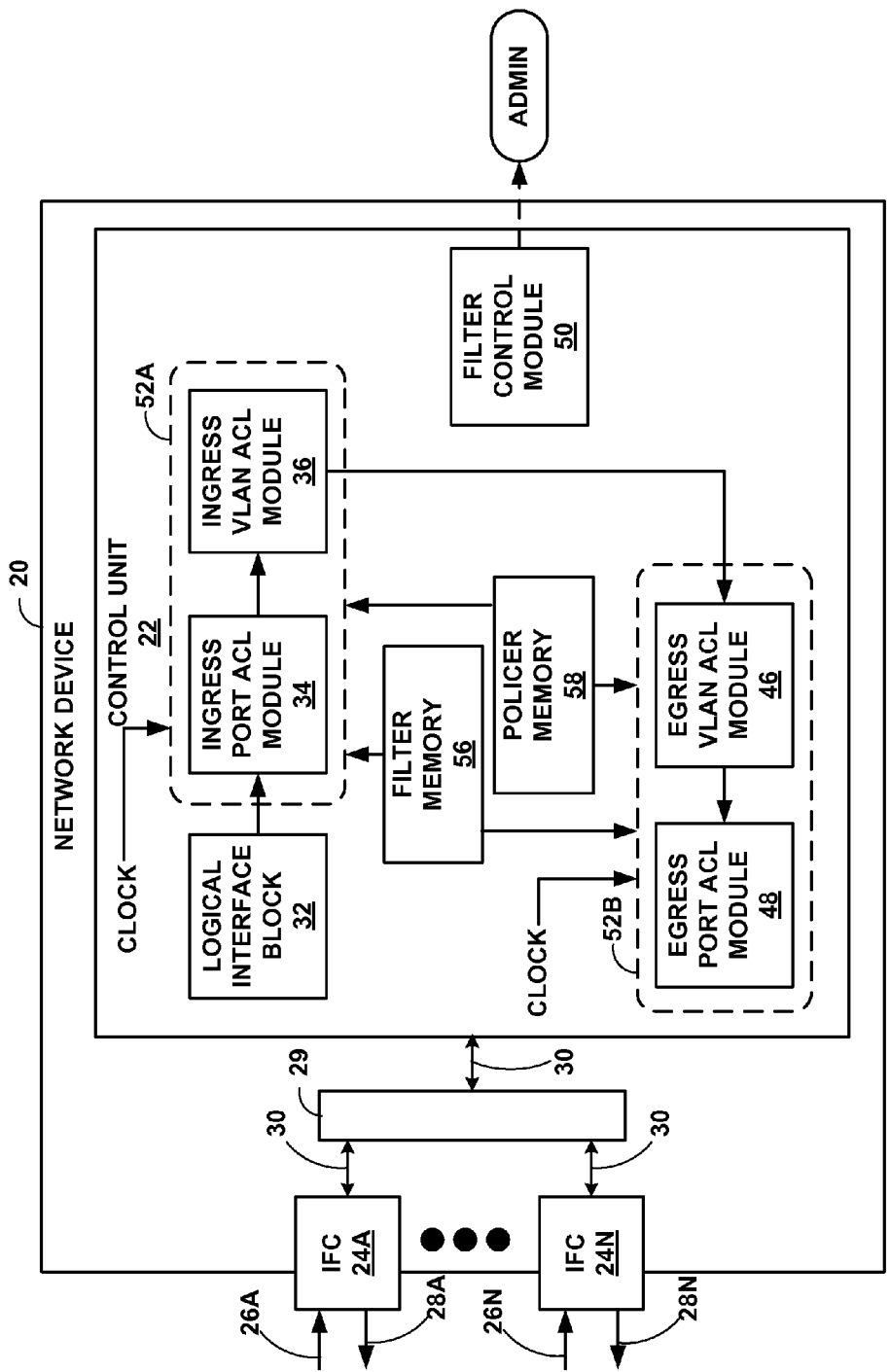
FIG. 2 is a block diagram illustrating an example network device that operates to merge filter rules in accordance with the principles of the invention.

FIG. 2 is a block diagram illustrating an example network device 20 that operates to merge filter rules in accordance with the principles of the invention. Network device 20 may, for example, represent network device 4 of FIG. 1. Network device 20 may be, for example, an Ethernet switch that provides switching services, as well as L3 services such as packet routing. In addition, network device 20 may incorporate firewall components that apply firewall filters to filter inbound and outbound packets in conjunction with application of the packet forwarding and switching services.

In the exemplary embodiment illustrated in FIG. 2, network device 20 includes a set of interface cards 24A-24N that provide a set of physical ports for communicating packets via inbound links 26A-26N (collectively, "inbound links 26") and outbound links 28A-28N (collectively, "outbound links 28"). IFCs 24 are connected to control unit 22 by a high-speed backplane 29 and links 30. In one example, backplane 29 comprises separate data busses, switch fabric, switchgear, a configurable crossbar switch or other means for coupling IFCs to control unit 22. Links 30 comprise any form of communication path, such as electrical paths within an integrated circuit, data busses, optical links, or other type of high-speed communication path. Each IFC 24 may, for example, represent a separate network interface card (NIC) coupled to control unit 22 in isolation from the other interface cards. IFCs 24 may be coupled to inbound links 26 and outbound links 28 via a number of interface ports (not show in FIG. 2).

Network device 20 includes a control unit 22 comprising an embedded microprocessor or microcontroller as well as or one or more high-speed switching ASICs that incorporate a number of functional blocks. For example, the switching ASICs provide a forwarding path that include logical interface block 32, ingress port access control list (ACL) module 34, ingress virtual local area network (VLAN) ACL module 36, egress VLAN ACL module 46, egress port ACL module 48.

The embedded microprocessor or microcontroller provides an operating environment for management software that presents a user interface by which an administrator (ADMIN) interacts with filter control module 50, some or all of which may be implemented as executable software instructions.

Control unit 22 may include additional modules (not shown), such as modules that provide bridging functionality, modules that provide layer three (L3) routing functionality, and modules that determine whether to drop packets and which packets to drop first in order to maintain line-rate performance of network device 20, and other functions.

The internal high-speed switching ASICs include ingress port ACL module 32, ingress VLAN ACL module 36, egress port ACL module 46, and egress VLAN ACL module 48 that are generally referred to herein as filter matching modules. The filter matching modules are located along the forwarding path provided by the ASICs, and match and take action on packets by applying filters as the packets traverse network device 20. In applying the filters, the filter matching modules determine whether the packets match criteria of rules associated with the filters. In particular, ACL modules 32, 36, 46, and 48 are firewall components that operate to filter packets matching firewall filters. Ingress port ACL module 32 and ingress VLAN ACL module 36 apply one or more filters to incoming packets received from logical interface block 32, each of modules 32 and 36 operating at the port level and the VLAN level, respectively. Ingress port ACL module 32 and ingress VLAN ACL module 36 may be components of a single ASIC 52A within control unit 22. In a similar manner, egress port ACL module 46 and egress VLAN ACL module 48 apply one or more filters to outgoing packets, each of module 46 and 48 operating at the port level and the VLAN level, respectively. Egress port ACL module 46 and egress VLAN ACL module 48 may be components of a single ASIC 52B.

ASICs 52A-52B ("ASICs 52") may access filter memory 56 and action memory 58 to obtain filters and other information for filtering packets as the packets are forwarded by network device 20. Filter memory 56 may store filters, wherein each of the filters specifies one or more rules to be applied. The rules may consist of matching criteria and corresponding action IDs. The action IDs reference actions stored in action memory 58 to be applied when a packet is found to match the criteria for a rule. Any of a variety of features of network traffic may be used as matching criteria. For example, source Internet Protocol (IP) address, destination IP address, protocol type, source port, destination port, or other criteria may be used as matching criteria, alone or in combination.

Action memory 58 may store action IDs and corresponding actions. Actions may include any of a variety of actions to be taken on received packets, and may additionally require certain conditions to be met before the action is taken. For example, an action may specify to drop or count any packets matching the matching criteria. As another example, an action may specify to drop the packets matching the matching criteria only when a given bandwidth limit has been exceeded. An action may also specify that control unit 22 should change loss properties when a given bandwidth limit has been exceeded. Although illustrated as separate memory structures, information stored within filter memory 56 and action memory 58 may be stored in a single filter memory data structure, in which entries include the actions for each rule without reference to an intermediate action identifier.

The filters stored within filter memory 56 may be defined dynamically based on information exchanged by protocols executing on control unit 22 (not shown), or may be manually specified by a user, such as an administrator. For example, filter control module 50 may present a user interface to an administrator to allow the administrator to configure filter memory 56 and action memory 58, and to program ACL modules 34, 36, 46, 48, and ASICs 52.

In some embodiments, it may be desirable or required by certain timing constraints to limit each of ASICs 52 within control unit 22 to a cycle of a clock signal (CLOCK) controlling data flow along the internal forwarding path. That is, a single clock cycle only may be required for lookup and application of a filter from filter memory 56 and/or action memory 58. For example, such a limitation may be necessitated by the particular architecture of a chip set that includes ASICs 52 as packets propagate along the internal forwarding path of control unit 22 provided by the ASICs. The clock sends signals to ASICs 52 to control data flow along the forwarding path within the network device. As another example, such a limitation may be imposed in order for network device 20 to achieve line-rate performance for the forwarding path. As yet another example, such a limitation may be imposed to make additional lookup cycles available for adding additional components or services to network device 20, while still achieving line-rate performance.

As described herein, an administrator may program each of ASICs 52 via filter control module 50 to store a respective filter identifier to control the corresponding filter to be applied by each ASIC as packets flow through network switch 20. ASICs 52 use the stored filter identifiers as an index into filter memory 56 to access the correct filter to apply.

In some cases it may be desirable for ingress port ACL module 34 and ingress VLAN ACL module 36 to each apply a different individual filter to packets received from logical interface block 32. This, however, would require two or more cycles of the hardware along the internal packet forwarding path to access and apply the appropriate filters, one cycle for each of ACL modules 34, 36. In order to reduce the requirements of ASIC 52A to a single lookup cycle and yet allow multiple filters to be applied, filter control module 50 may operate to automatically merge the individual filters separately defined by the administrator for ACL modules 34, 36 into a single combined filter (referred to as a "merged filter."). Filter control module 50 may similarly merge individual filters separately defined for egress VLAN ACL module 46 and egress port ACL module 48 into a single combined filter, to allow ASIC 52B to apply both a port-based filter and a VLAN-based filter in a single lookup cycle. This may allow control unit 22 to free up additional cycles for other operations, such as layer 3 quality of service, router ACLs, and policy based routing.

For example, assume filter memory 56 stores a first filter $F_1$ corresponding to ingress port ACL module 34 and a second filter $F_2$ corresponding to ingress VLAN ACL module 36. Filter control module 50 may merge filters $F_1$ and $F_2$ into a single filter $F_{12}$, and store the merged filter $F_{12}$ to filter memory 56. As one example, filter control module 50 may perform the merge to combine individual rules from each of the filters by taking the intersection of the match criteria and the union of the actions for different rule combinations. The number of rules $N_{F12}$ in the merged filter $F_{12}$ is determined by the following equation:

$$N_{F12} = (M \times N) + (M+N),$$

where M is the number of rules in $F_1$, and N is the number of rules in $F_2$.

A filter may be represented in the form F={R={matching criteria; action}, . . . }, and may include one or more rules R. Filter control module 50 may apply the operation "filtermerge" to merge two or more filters. "Filtermerge" may be an application program interface (API) that is provided in a library accessible to various applications to merge filters before programming entries of filter memory 56.

Filter control module 50 may apply one or more optimizations in storing the merged rule. Some example optimizations may require no duplicate terms across filters or within a filter, or no terms with duplicate match conditions across filters or within filters. Another example optimization may require that if the intersection of two rules is a null set, then the merged rule is not added to the entry of filter memory 56.

The following examples illustrate filter control module 50 in applying the "filtermerge" API to merge two filters.

$$\text{Where } F_1 = \begin{cases} R_{11} = \{\text{If\_protocol} = 20; countC1\} \\ R_{12} = \{\text{If\_scrIP} = 1.1.1.1; countC2\} \end{cases} \text{and}$$

-continued $$F_2 = \begin{cases} R_{21} = \{\text{If\_port} = 30; actionA1\} \\ R_{22} = \{\text{If\_protocol} = 30; syslog\} \end{cases},$$

$$F_{12} = filtermerge(F_1, F_2) = \begin{cases} R_{11} \oplus R_{21} = \{\text{If\_protocol} = 20\_and\_port = 30; countC1\_and\_actionA1\} \\ R_{12} \oplus R_{21} = \{\text{If\_protocol} = 20\_and\_srcIP = 1.1.1.1; countC2\_and\_actionA1\} \\ R_{12} \oplus R_{22} = \{\text{If\_protocol} = 30\_and\_srcIP = 1.1.1.1; countC2\_and\_syslog\} \\ R_{11} = \{\text{If\_protocol} = 20; countC1\} \\ R_{12} = \{\text{If\_srcIP} = 1.1.1.1; countC2\} \\ R_{21} = \{\text{If\_port} = 30; actionA1\} \\ R_{22} = \{\text{If\_protocol} = 30; syslog\}, \end{cases}$$

where the operation "$\oplus$" represents taking the intersection of the rules and the union of the actions.

As can be seen from the above example, merging rules $R_{11}$ and $R_{21}$ results in a rule $R_{11} \oplus R_{21}$ having the intersection of the respective matching criteria of each rule (here, a protocol of 20 and a port of 30), and the union of the respective actions, (here, instructions to apply both count C1 and action A1). Merging rules $R_{11}$ and $R_{22}$ results in a rule $R_{11} \oplus R_{22}$ having a null set for the matching criteria, since a packet can either have a protocol of 20 or a protocol of 30, but not both (i.e., the intersection is null). In effect, rule $R_{12} \oplus R_{21}$ is a null rule, which in some embodiments is not stored as part of $F_{12}$.

As another example, where $$F_3 = \begin{cases} R_{11} = \{\text{If\_port} = 10 - 50; actionA1\} \\ R_{12} = \{\text{If\_protocol} = 30; countC2\} \end{cases} \text{ and}$$

$$F_4 = \begin{cases} R_{21} = \{\text{If\_port} = 20 - 60; countC1\} \\ R_{22} = \{\text{If\_protocol} = 30; syslog\} \end{cases},$$

$$F_{34} = filtermerge(F_3, F_4) = \begin{cases} R_{11} \oplus R_{21} = \{\text{If\_protocol} = 20 - 50; actionA1\_and\_countC1\} \\ R_{11} \oplus R_{22} = \{\text{If\_port} = 10 - 50\_and\_protocol = 30; actionA1\_and\_syslog\} \\ R_{12} \oplus R_{21} = \{\text{If\_protocol} = 30\_and\_port = 20 - 60; countC1\} \\ R_{12} \oplus R_{22} = \{\text{If\_protocol} = 30; countC2\_and\_syslog\} \\ R_{11} = \{\text{If\_port} = 10 - 50; actionA1\} \\ R_{21} = \{\text{If\_port} = 20 - 60; countC1\}. \end{cases}$$

As can be seen from the above example, merging rules $R_{11}$ and $R_{21}$ results in a rule $R_{11} \oplus R_{21}$ having the intersection of the respective matching criteria of each rule (here, the overlap of the port number ranges of each of the rules). In this example, rules $R_{12}$ and $R_{22}$ are not stored as part of the $F_{34}$ entry of filter memory 56, because the same match condition (If protocol=30) is already present in rule $R_{12} \oplus R_{22}$.

An administrator may set one or more policies within control unit 22 to control what to do when a merged rule indicates that more than one action is to be applied. The policies may identify a priority scheme that specifies an order in which to apply the actions. For example, when one action corresponds to an action of 'count packet' and the other action corresponds to an action of 'drop packet,' the order the actions are applied is important. In addition, in some embodiments only a single action will be applied, so there must be a way to determine which of the actions should be applied. The administrator may specify, for example, to prioritize the actions based on the order the actions are listed (e.g., apply the last action first, or apply the first action first), the time the policy was added, whether the policies were added by an administrator or were dynamically protocol-driven, and so on.

In other embodiments, filter control module 50 may use techniques for merging filter rules other than that given in the above example. For example, filter control module 50 may merge multiple filter rules by taking the union of the matching criteria and the union of the actions.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. Accordingly, this disclosure also contemplates a computer-readable medium comprising instructions that upon execution cause the device to perform techniques as described in this disclosure. In some cases, the computer readable medium may form part of a computer program product comprising computer readable medium.

FIG. 3 is a block diagram illustrating an example filter memory 56 of network device 20 of FIG. 2. In the example of FIG. 3, filter memory 56 includes a filter identifier column 60 that identifies the filter in each entry, and rules column 62 that includes one or more rules for each filter. Rules column 62 is further subdivided into a rule identifier (ID) sub-column 64, a matching criteria sub-column 66, and an action ID sub-column 68. When one of the filter matching modules of network device 20 applies a filter, the filter matching module will apply each of the rules of the filter in order until finding a matching rule, i.e., a rule for which the matching criteria matches to the packet. Filter control module 50 may spread filter entries throughout filter memory 56, in order to maintain an order of the filter entries while still allowing room for future filter entries to be added at desired positions within filter memory 56. This may reduce the amount of movement of rules within filter memory 56.

Filter memory 56 may store individual filter rules applied by each of ingress port ACL module 34, ingress VLAN ACL module 36, egress port ACL module 48, and egress VLAN ACL module 46. For example, as shown in FIG. 3, $F_3$ is a filter that corresponds to ingress port ACL module 34, $F_4$ is a filter that corresponds to ingress VLAN ACL module 36, $F_5$ is a filter that corresponds to egress port ACL module 48, and $F_6$ is a filter that corresponds to egress VLAN ACL module 46. Filter control module 50 merges filters $F_3$ and $F_4$ into a single filter $F_{34}$ for ASIC 52A, merges filters $F_5$ and $F_6$ into a single filter $F_{56}$ for ASIC 52B, and stores $F_{56}$ as a new entry within filter memory 56. Although filter control module 50 may program ASICs 52 with only their respective merged filters, filter memory 56 may continue to store the individual, unmerged filters and may present the unmerged filters to the administrator for ease of management. Alternatively, filter memory 56 may present only the merged rules to the administrator.

Although not shown in the example of FIG. 3, filter memory 56 may include fields containing other information, such as an indication of whether a given filter was configured dynamically or by an administrator. Filter memory 56 may also include a date/timestamp indicating when the filter was added or modified.

FIG. 4 is a block diagram illustrating an example action memory 58 of network device 20 of FIG. 2. In the example of FIG. 4, action memory 58 includes an action identifier (ID) column 70 that identifies the action in each entry, and an action column 72 that includes a corresponding action to be applied. ASICs 52 may retrieve an action from action memory 58 based on the action ID listed in a matching rule of filter memory 56.

Network device 20 may maintain filter memory 56 and policies memory 58 in the form of one or more tables, databases, link lists, radix trees, databases, flat files, or any other data structures. As one example, network device 20 may store filter memory 56 and policies memory 58 within a content-addressable memory (CAM), e.g., a ternary CAM (TCAM) memory. As another example, network device 20 may store filter memory 56 and policies memory 58 within a synchronous dynamic random access memory (SDRAM).

Figure 5:
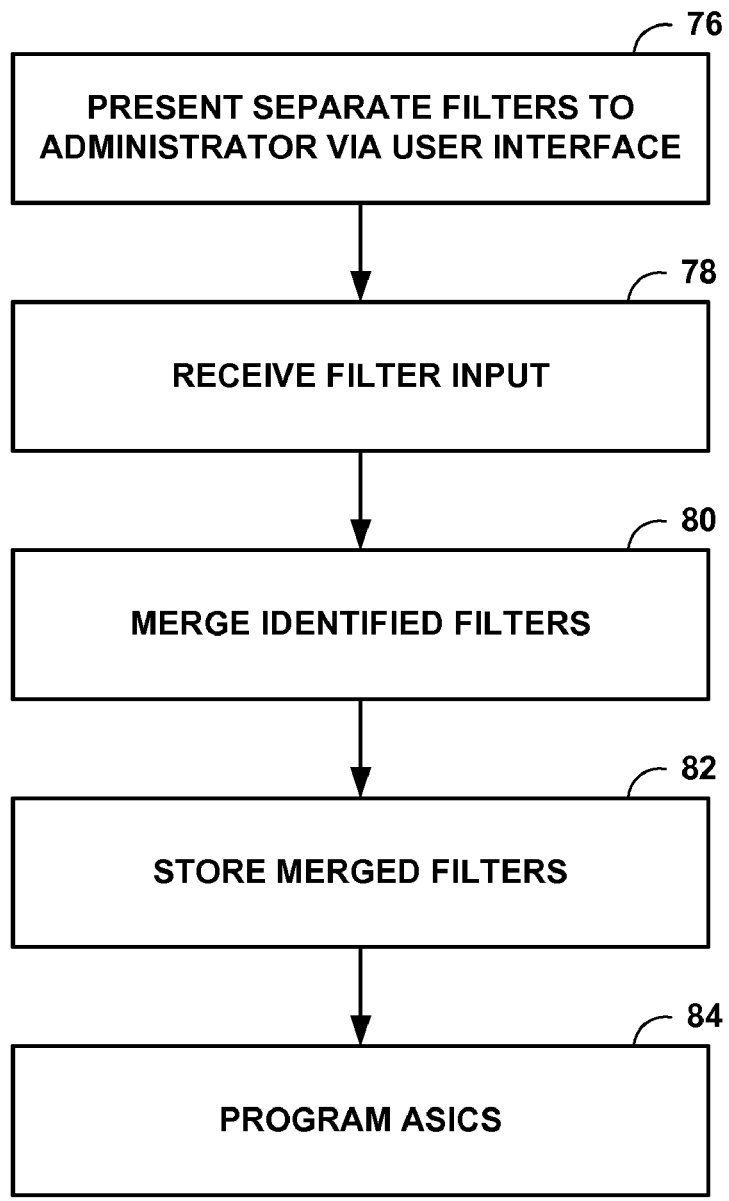
FIG. 5 is a flowchart illustrating exemplary operation of a filter control module of the network device of FIG. 2.

FIG. 5 is a flowchart illustrating exemplary operation of filter control module 50 of the network device 20 (FIG. 2). Filter control module 50 may present a user interface that displays separate filters for each of the firewall components to an administrator via a user interface (76). The administrator may input new filters or update filters already stored within filter memory 56 via the user interface. This allows, for example, the administrator to intuitively control the filters for all of the firewall components separately and independently without being burdened with having to manually combine rules and actions into single filters for each switching ASIC. Moreover, this allows administrator to manage the filters without any particular knowledge of the underlying timing constraints of the forwarding path provided by the switching ASICs.

In some cases, the administrator may identify particular filters to be merged. For example, the administrator may identify filters associated with ingress port ACL module 34 and ingress VLAN ACL module 36 to be merged, and may identify filters associated with egress port ACL module 48 and egress VLAN ACL module 46 to be merged. In other cases, a software agent may automatically select the filters to be merged. In either case, filter control module 50 receives the filter input provided by the administrator (78).

Filter control module 50 merges the identified filters, e.g., by taking the intersection of the filter criteria and the union of the actions (80). Filter control module 50 stores the merged filters to filter memory 56 (82). Filter control module 50 programs ASICs 52 with an index into filter memory 56 that allows ASICs 52 to access the appropriate merged filters for application to inbound and outbound packets. In addition, filter control module 50 may continue to store the original, non-merged filters within filter memory 56, so as to be able to present the original, non-merged filters to the administrator for updates via the user interface.

Figure 6:
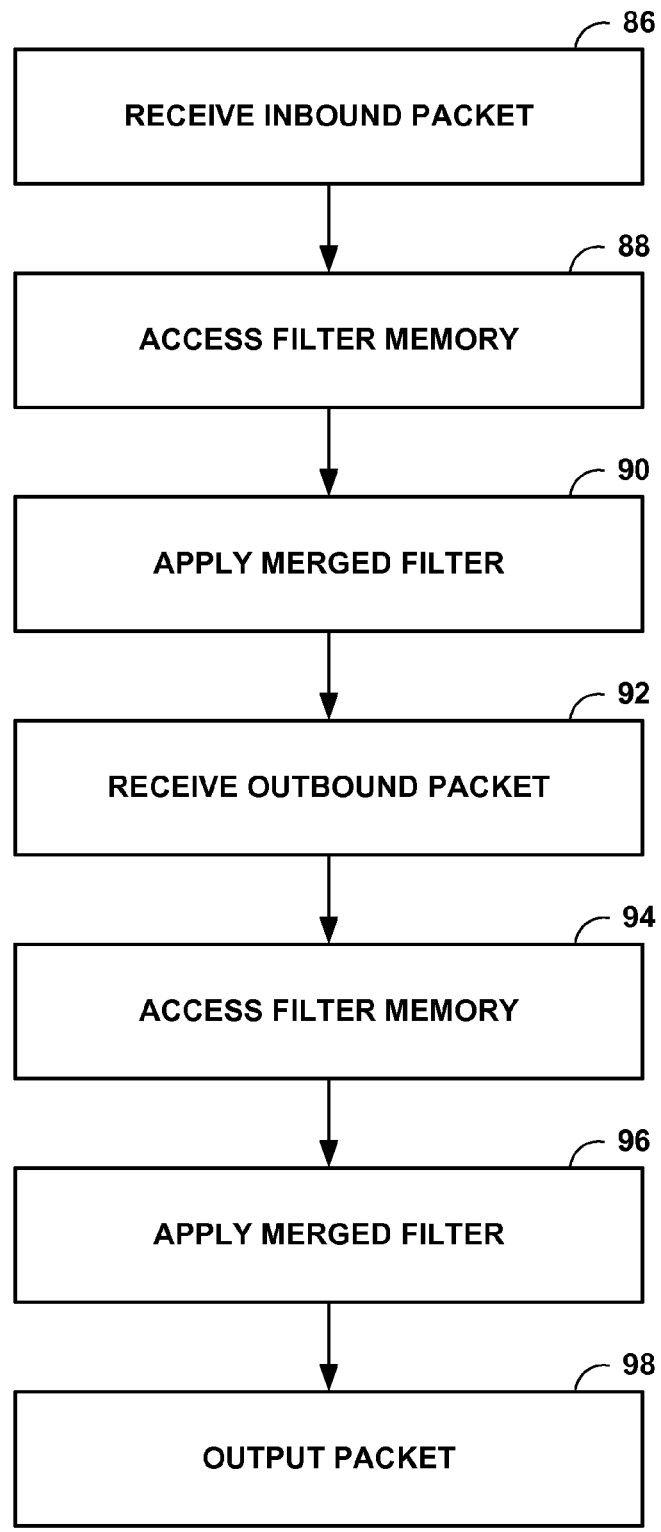
FIG. 6 is a flowchart illustrating exemplary operation of a network device in applying merged filters to packets within the forwarding path of the network device.

FIG. 6 is a flowchart illustrating exemplary operation of network device 20 in applying merged filters to packets within the internal forwarding path of network device 20. Network device 20 receives an inbound packet via one of inbound links 26 of an IFC 24 (86). IFC 24 communicates the inbound packet to control unit 22 via backplane 29 and links 30. Upon receiving the inbound packet at ASIC 52A, control unit 22 accesses filter memory 56 using the programmed index value associated with ASIC 52A to obtain the merged filter corresponding to ASIC 52A (88). As described above, the merged filter may have been merged from two or more individual filters associated with ingress port ACL module 34 and ingress VLAN ACL module 36.

Control unit 22 then applies the merged filter to the packet to determine whether the inbound packet matches any of the matching criteria of the rules associated with the merged filter (90). In this manner, ASIC 52A of control unit 22 is able to retrieve and apply the appropriate merged filter within a reduced time constraint, e.g., within a single cycle of the clock controlling timing along the internal forwarding path provided by the switching ASICS 52, If a match is identified, control unit 22 may apply an action retrieved from action memory 58, where the action is identified as associated with the matching rule. Specifically, control unit 22 applies an action as identified by the action ID to the inbound packet. For example, the action may specify to count the inbound packet, drop the inbound packet, or take other action with respect to the inbound packet. If the inbound packet does not match any of the matching criteria of the rules associated with the merged filter, control unit 22 may continue with processing the inbound packet. For example, control unit 22 may determine which of IFCs 24 on which to output the packet according to information stored within the inbound packet.

Control unit 22 may also receive an outbound packet to be output by network device 20 (92). The outbound packet may the inbound packet after it has been processed by control unit 22, or may be a new packet formed by control unit for output. Control unit 22 accesses filter memory 56 using the programmed index value associated with ASIC 52B to obtain the merged filter corresponding to ASIC 52B (94). As described above, the merged filter may have been merged from individual filters associated with egress port ACL module 48 and egress VLAN ACL module 46.

Control unit 22 applies the merged filter to the outbound packet to determine whether the packet matches any of the matching criteria of the rules associated with the merged filter (96). Thus, ASIC 52B is similarly able to retrieve and apply the appropriate merged filter within a reduced time constraint, e.g., within a single cycle of the clock controlling timing along the internal forwarding path provided by the switching ASICS 52, If a match is detected, control unit 22 may apply an action retrieved from action memory 58 and associated with the matching rule. Control unit 22 then applies an action as identified by the action ID to the outbound packet. For example, the action may specify to count the outbound packet, drop the outbound packet, or take other action with respect to the outbound packet. If the outbound packet does not match any of the matching criteria of the rules associated with the merged filter, control unit 22 may continue with processing the outbound packet. For example, control unit 22 may output the packet via one of outbound interfaces 28 of an IFC 24 (98).

Various embodiments of the invention have been described. Although described for purposes of example with respect to an Ethernet switch having firewall functionality, the techniques of the invention may be applied to any network device that applies filter rules to network traffic. These and other embodiments are within the scope of the following claims.

What is claimed is:

1. A method comprising:
    receiving configuration input defining a plurality of filters for a network device, wherein each of the filters includes one or more rules, wherein each of the rules includes a matching criteria and a corresponding action, wherein each of the filters is associated with at least one of a plurality of filter matching modules provided by hardware components of the network device, and wherein the filter matching modules apply the filters to packets in a forwarding path internal to the network device;
    merging two or more of the filters that are each associated with a different one of the filter matching modules into a single merged filter, wherein merging two or more of the filters comprises taking the intersection of the matching criteria of each of the rules for each of the filters;

storing the merged filter to a filter memory within the network device; and applying the merged filter to packets in the forwarding path.

2. The method of claim 1, wherein taking the intersection of the matching criteria produces a null set for the matching criteria to produce a null rule for the merged filter, wherein storing the merged filter to a filter memory comprises storing only rules of the merged filter that are not null rules.

3. The method of claim 1, wherein the single merged filter does not include at least one of the two or more of the filters.

4. A method comprising:

receiving configuration input defining a plurality of filters for a network device, wherein each of the filters includes one or more rules, wherein each of the rules includes a matching criteria and a corresponding action, wherein each of the filters is associated with at least one of a plurality of filter matching modules provided by hardware components of the network device, and wherein the filter matching modules apply the filters to packets in a forwarding path internal to the network device;

merging two or more of the filters that are each associated with a different one of the filter matching modules into a single merged filter, wherein merging two or more of the filters comprises taking the union of the matching criteria and the union of the actions of each of the rules for each of the filters;

storing the merged filter to a filter memory within the network device; and applying the merged filter to packets in the forwarding path.

5. The method of claim 1, wherein the matching criteria comprise at least one of a source address, a destination address, a protocol type, a source port, and a destination port.

6. The method of claim 1, further comprising:

accessing the stored merged filter from the filter memory and applying the merged filter to a packet within a single cycle of a clock that controls data flow along the forwarding path within the network device.

7. The method of claim 1, wherein the filters are firewall filters, and wherein the filter matching modules are firewall filter matching modules that apply the firewall filters to analyze packets in the forwarding path of the network device.

8. The method of claim 1, further comprising configuring a policy to be applied when a merged filter has a rule with more than one action to be applied, wherein the policy identifies a priority order in which the actions are to be applied.

9. The method of claim 8, wherein the policy prioritizes the actions based on one of: (1) an order in which the actions are listed, (2) a time the action was stored to the filter memory, and (3) whether the policies were added by an administrator or were added dynamically based on information exchanged by a protocol.

10. A network device comprising:

an interface that receives packets from a network;

a filter memory that stores a plurality of filters;

one or more switching hardware components that provide a forwarding path internal to the network device, wherein the switching hardware components include a plurality of filter matching modules that apply the filters to packets along the forwarding path of the network device, wherein each of the filters is associated with at least one of the filter matching modules, wherein each of the filters includes one or more rules, and wherein each of the rules includes a matching criteria and a corresponding action; and a filter control module that merges two or more of the filters that are each associated with a different one of the filter matching modules into a single merged filter, wherein the filter control module merges the two or more filters by taking the intersection of the matching criteria of each of the rules for each of the filters, wherein the filter control module stores the merged filter to the filter memory for application to packets in the forwarding path by the filter matching modules.

11. The network device of claim 10, wherein taking the intersection of the matching criteria produces a null set for the matching criteria to produce a null rule for the merged filter, wherein the filter control module stores the merged filter to a filter memory by storing only rules of the merged filter that are not null rules.

12. The network device of claim 10, wherein the single merged filter does not include at least one of the two or more of the filters.

13. A network device comprising:

an interface that receives packets from a network;

a filter memory that stores a plurality of filters;

one or more switching hardware components that provide a forwarding path internal to the network device, wherein the switching hardware components include a plurality of filter matching modules that apply the filters to packets along the forwarding path of the network device, wherein each of the filters is associated with at least one of the filter matching modules, wherein each of the filters includes one or more rules, and wherein each of the rules includes a matching criteria and a corresponding action; and a filter control module that merges two or more of the filters that are each associated with a different one of the filter matching modules into a single merged filter, wherein the filter control module merges the two or more filters by taking the union of the matching criteria and the union of the actions of each of the rules for each of the filters, wherein the filter control module stores the merged filter to the filter memory for application to packets in the forwarding path by the filter matching modules.

14. A non-transitory computer readable medium comprising instructions for causing one or more programmable processors to:

receive configuration input defining a plurality of filters for a network device, wherein each of the filters includes one or more rules, wherein each of the rules includes a matching criteria and a corresponding action, wherein each of the filters is associated with at least one of a plurality of filter matching modules provided by hardware components of the network device, and wherein the filter matching modules apply the filters to packets in a forwarding path internal to the network device;

merge two or more of the filters that are each associated with a different one of the filter matching modules into a single merged filter by taking the intersection of the matching criteria of each of the rules for each of the filters;

store the merged filter to a filter memory within the network device; and apply the merged filter to packets in the forwarding path.

15. A non-transitory computer readable medium comprising instructions for causing one or more programmable processors to:

receive configuration input defining a plurality of filters for a network device, wherein each of the filters includes one or more rules, wherein each of the rules includes a matching criteria and a corresponding action, wherein each of the filters is associated with at least one of a plurality of filter matching modules provided by hardware components of the network device, and wherein the filter matching modules apply the filters to packets in a forwarding path internal to the network device;

merge two or more of the filters that are each associated with a different one of the filter matching modules into a single merged filter by taking the union of the matching criteria and the union of the actions of each of the rules for each of the filters;

store the merged filter to a filter memory within the network device; and apply the merged filter to packets in the forwarding path.

* * * * *